UNITED STATES PATENT OFFICE.

ALFRED H. RAMEY, OF AURORA, ILLINOIS.

LIVER AND KIDNEY REMEDY.

SPECIFICATION forming part of Letters Patent No. 407,687, dated July 23, 1889.

Application filed April 8, 1889. Serial No. 306,434. (No specimens.)

*To all whom it may concern:*

Be it known that I, ALFRED H. RAMEY, of Aurora, in the county of Kane and State of Illinois, have invented certain new and useful Improvements in Compounds for Relief of Diseases of the Kidneys and of the Liver and Urinary Organs, &c.; and I do hereby declare that the following is a full, clear, and exact description of the invention, which will enable others skilled in the art to which it appertains to make and use the same.

My composition is intended as a remedy for diseases of the kidneys and of the liver and of the urinary organs. It consists of a compound made in accordance with the following formula, the proportions here named being given upon the basis of eight ounces of the completed article.

The component parts or ingredients are employed by weight relatively as follows: Fluid extract of buchu, (*Barosma crenata*,) two ounces; sweet spirits of niter, one ounce; acetate of potassium, one dram; fluid extract of couch-grass, (*Triticum repens*,) one ounce; fluid extract of juniper-berries, (*Juniperus*,) one dram; pure granulated sugar in sufficient quantity to make with the above eight ounces altogether.

In compounding these ingredients I preferably proceed as follows: By first mixing thoroughly the spirits of buchu and niter, then add the acetate of potassium, and after thoroughly agitating these add the extracts of juniper-berries and couch-grass.

This compound has been found to be useful and to afford substantial relief to persons afflicted with Bright's disease, inflammation of the kidneys, gravel and catarrh of the bladder, or rheumatism.

While the above relative proportions of the ingredients may in some cases be slightly departed from—dependent on the strength or character of any one or more of the materials used in the compound—yet the above-stated formula constitutes substantially the guide for making and compounding.

A proper dose of the compound for an adult is about one tea-spoonful four times a day— say before meals and before going to bed. If the patient's stomach be weak, the compound should be diluted with milk or with water and sugar. For children of ten years of age and younger give one-fourth to one-half a tea-spoonful say three times a day.

I am aware that in making certain kinds of extract of buchu some, but not all, of the ingredients above named have been used.

What I claim, and desire to secure by Letters Patent of the United States, is—

The herein-described composition of matter to be used for diseases of the kidneys, liver, and urinary organs, consisting of fluid extract of buchu, spirits of niter, acetate of potassium, fluid extract of couch-grass, fluid extract of juniper-berries, and granulated sugar, in substantially the proportions specified.

ALFRED H. RAMEY.

Witnesses:
C. W. HALLOCK,
F. E. WILSON.